(12) United States Patent
Ganis et al.

(10) Patent No.: US 10,066,649 B2
(45) Date of Patent: Sep. 4, 2018

(54) HYBRID METALLIC/COMPOSITE PISTON HEAD JOINT

(71) Applicant: Goodrich Corporation, Charlotte, NC (US)

(72) Inventors: Rony Ganis, Oakville (CA); James Bernard, London (GB); Ioannis Giannakopoulos, London (GB); Panagiota Chatzi, Oxford (GB); Thomas Higginbottom, Hampshire (GB)

(73) Assignee: Goodrich Corporation, Charlotte, NC (US)

( * ) Notice: Subject to any disclaimer, the term of this patent is extended or adjusted under 35 U.S.C. 154(b) by 314 days.

(21) Appl. No.: 14/882,200

(22) Filed: Oct. 13, 2015

(65) Prior Publication Data

US 2017/0102012 A1 Apr. 13, 2017

(51) Int. Cl.
| | |
|---|---|
| *F15B 15/14* | (2006.01) |
| *B64C 25/12* | (2006.01) |
| *B64C 25/18* | (2006.01) |
| *F16J 1/00* | (2006.01) |
| *F16J 1/12* | (2006.01) |
| *F16C 3/02* | (2006.01) |
| *F16C 7/02* | (2006.01) |

(52) U.S. Cl.
CPC .......... *F15B 15/1447* (2013.01); *B64C 25/12* (2013.01); *B64C 25/18* (2013.01); *F15B 15/1452* (2013.01); *F16C 3/026* (2013.01); *F16C 7/026* (2013.01); *F16J 1/005* (2013.01); *F16J 1/006* (2013.01); *F16J 1/008* (2013.01); *F16J 1/12* (2013.01)

(58) Field of Classification Search
CPC ...... F16J 1/12; F16J 1/005; F16J 1/006; F16J 1/008; F16C 7/026; F16C 3/026; F15B 15/1447; F15B 15/1452; B64C 25/12
See application file for complete search history.

(56) References Cited

U.S. PATENT DOCUMENTS

| 4,875,717 | A | 10/1989 | Policelli | |
|---|---|---|---|---|
| 9,482,266 | B2 * | 11/2016 | Dewhirst | ................ F16C 3/026 |
| 2015/0284957 | A1 | 10/2015 | Ganis | |

(Continued)

FOREIGN PATENT DOCUMENTS

| DE | 3507520 | 9/1986 |
|---|---|---|
| DE | 102014204617 | 9/2015 |

(Continued)

OTHER PUBLICATIONS

Extended European Search Report dated Mar. 15, 2017 in European Application No. 16193727.1.
U.S. Appl. No. 14/609,975, filed Jan. 30, 2015, Eric Goldring

*Primary Examiner* — Michael Leslie
*Assistant Examiner* — Abiy Teka
(74) *Attorney, Agent, or Firm* — Snell & Wilmer L.L.P.

(57) ABSTRACT

The present disclosure describes composite actuator piston rods and methods for making such rods. Composite actuator piston rods of the present disclosure may include a composite actuator rod tube having a flared end, an insert, wherein the insert has a complementary shape to the flared end, a piston head concentrically surrounding the flared end of the composite actuator rod tube, and a piston head nut configured to threadingly attach to the piston head.

20 Claims, 7 Drawing Sheets

(56) References Cited

U.S. PATENT DOCUMENTS

2015/0377262 A1* 12/2015 Besliu ................ F15B 15/1438
91/405
2016/0222993 A1 8/2016 Goldring

FOREIGN PATENT DOCUMENTS

FR  1491084  8/1967
GB  2454958  5/2009

* cited by examiner

HYBRID METALLIC/COMPOSITE PISTON HEAD JOINT

FIELD

The present disclosure relates generally to actuators and more specifically to actuators having composite actuator piston tubes.

BACKGROUND

Conventionally, various types of aircraft utilize actuators including, for example, to deploy nose, body, and/or wheel landing gear systems. Conventional actuator components are made of metallic materials and often comprise complex geometries and high strengths. However, these metallic components are typically heavy.

SUMMARY

An actuator in accordance with various embodiments may comprise a composite actuator rod tube having a flared end, an insert, wherein the insert has a complementary shape to the flared end, a piston head concentrically surrounding the flared end of the composite actuator rod tube, and a piston head nut configured to threadingly attach to the piston head.

In various embodiments, the insert may be configured to be positioned at least partially within the flared end. The flared end may be compressed between the piston head and the insert. The actuator may further comprise a locking mechanism for securing the piston head to the piston head nut. The locking mechanism may comprise a locking pin coupled between the piston head and the piston head nut to prevent the piston head nut from rotating with respect to the piston head. The locking pin may be secured by a bearing, the bearing located radially outward from the locking pin. An outer surface of the insert may include a sealing groove. The piston head may comprise a sealing groove. An outer surface of the piston head nut may include a bearing groove.

A landing gear system in accordance with various embodiments may comprise an actuator. The actuator may comprise a composite actuator rod tube having a flared end, an insert, wherein the insert has a complementary shape to the flared end, a piston head concentrically surrounding the flared end of the composite actuator rod tube, and a piston head nut configured to threadingly attach to the piston head.

In various embodiments, the insert may be configured to be positioned at least partially within the flared end. The flared end may be compressed between the piston head and the insert. An outer surface of the insert may comprise a sealing groove. At least one of the piston head, piston head nut, or the insert may comprise a metallic material. The actuator may further comprise a locking mechanism for securing the piston head to the piston head nut.

A method for forming an actuator in accordance with various embodiments may comprise forming a composite actuator rod tube having a flared end concentrically surrounding an insert having a complementary shape to the flared end.

In various embodiments, the method may further comprise sealing the actuator rod tube to the insert. The method may further comprise surrounding the flared end with a piston head and sealing the piston head to the actuator rod tube. The method may further comprise compressing the flared end between the piston head and the insert. The method may further comprise locking a piston head nut to the piston head.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes actuators having a composite actuator rod. Such actuators may be used in aircraft systems, such as, for example, landing gear systems. However, the systems and methods of the present disclosure may be suitable for use in non-aircraft systems as well.

Figure 1B:
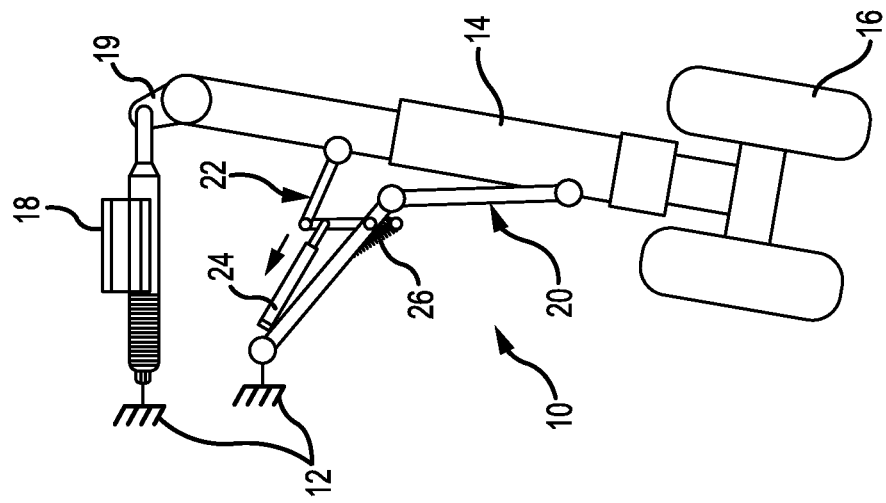
FIGS. 1A and 1B illustrate side views of a landing gear system in accordance with various embodiments.
Figure 1A:
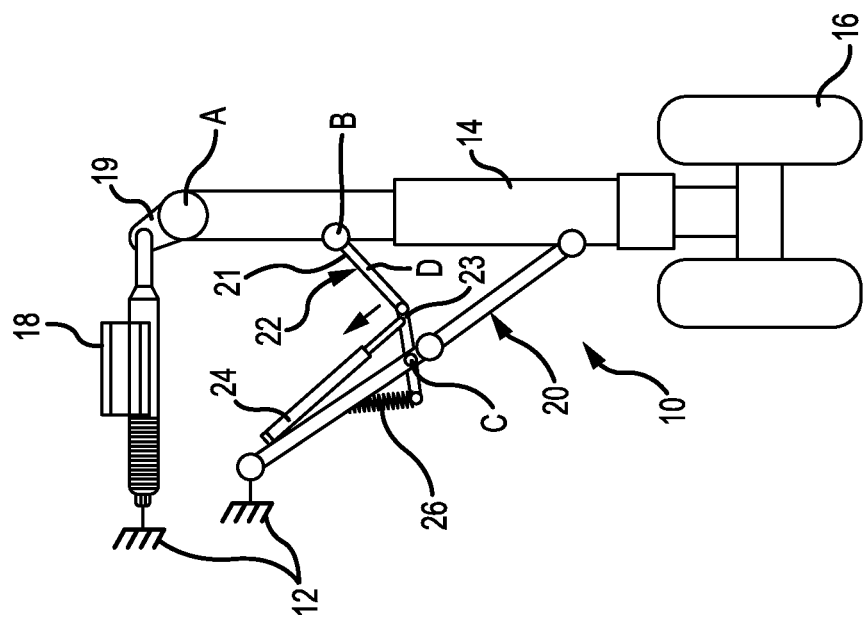

With initial reference to FIGS. 1A and 1B, a retraction sequence of a landing gear system 10 is illustrated. In various embodiments, landing gear 10 includes a strut 14 supporting wheels 16. Strut 14 is rotatable about a pivot, such as airframe 12, in response to an extend/retract actuator 18 applying a force to an arm 19. A linkage 20 may connect a lower portion of strut 14 to airframe 12, for example. A lock-stay 22 may be interconnected between linkage 20 and strut 14 to lock landing gear 10 in a deployed position until landing gear retraction is commanded.

In FIG. 1A, landing gear 10 is shown in the deployed position. The example lock-stay 22 includes first link 21 and second link 23 pivotally secured to one another at a joint D. One end of first link 21 is connected to strut 14 at pivot B. A portion of second link 23 is connected to linkage 20 at pivot C. A biasing member 26 is arranged between lock-stay 22 and linkage 20 to bias lock-stay 22 to the locked position. An unlock actuator 24 is interconnected between linkage 20 and lock-stay 22 to pull joint D from over-center, as depicted by the arrow in FIG. 1B, so that extend/retract actuator 18 can move landing gear 10 to a stowed position.

Figure 2:
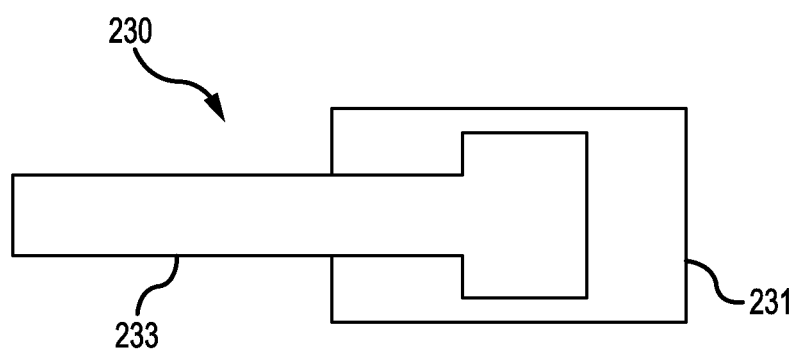
FIG. 2 illustrates a schematic view of an actuator in accordance with various embodiments.

With initial reference to FIG. 2, a schematic diagram of actuator 230 is illustrated. Actuator 230 may comprise an actuator body 231 into which a actuator rod tube 233 (also referred to as an actuator piston) retracts and extends. Actuator 230 may comprise, for example an extend/retract actuator 18 or an unlock actuator 24 (as illustrated in FIGS. 1A and 1B), or any other type of actuator suitable for use in body-type landing gear systems. Further, actuator 230 may comprise an actuator suitable for use in other systems, including flight control systems, wing and nose landing gear systems, and any other system which utilizes one or more actuators, including non-aircraft systems.

Figure 3A:
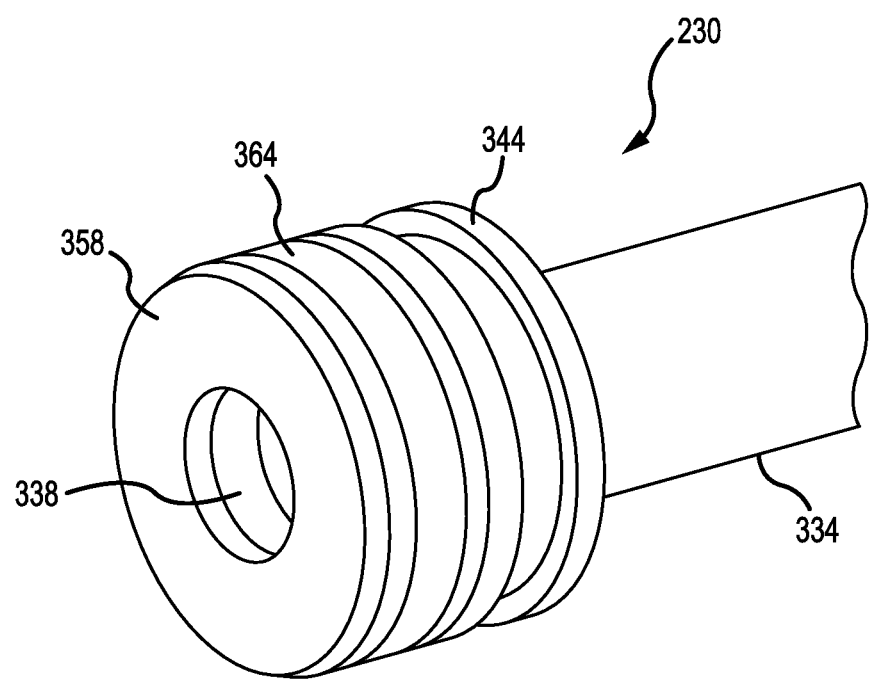
FIGS. 3A, 3B, and 3C illustrate, respectively, a perspective view, a cross-sectional view, and an exploded view of an actuator in accordance with various embodiments.
Figure 3B:
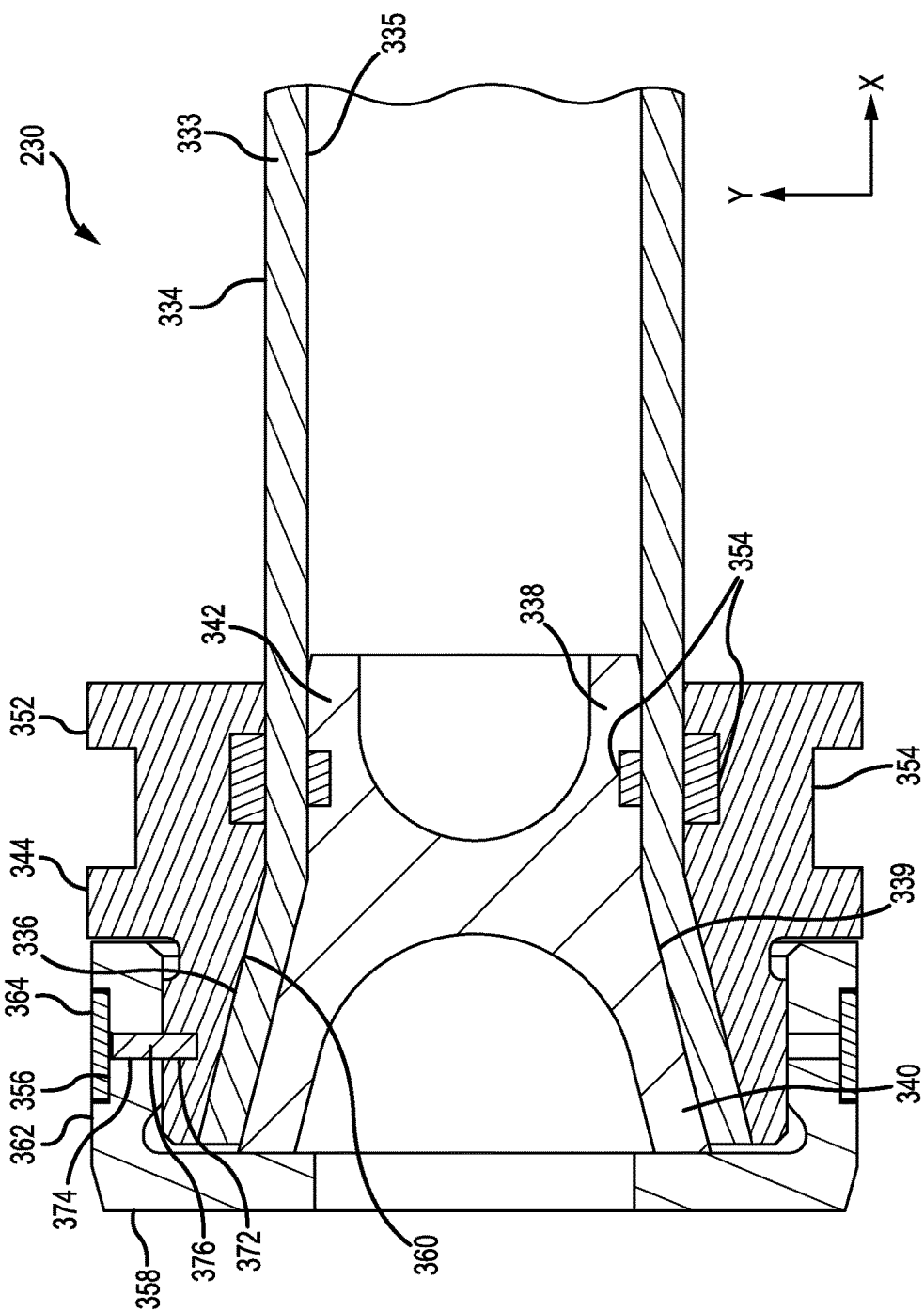
Figure 3C:
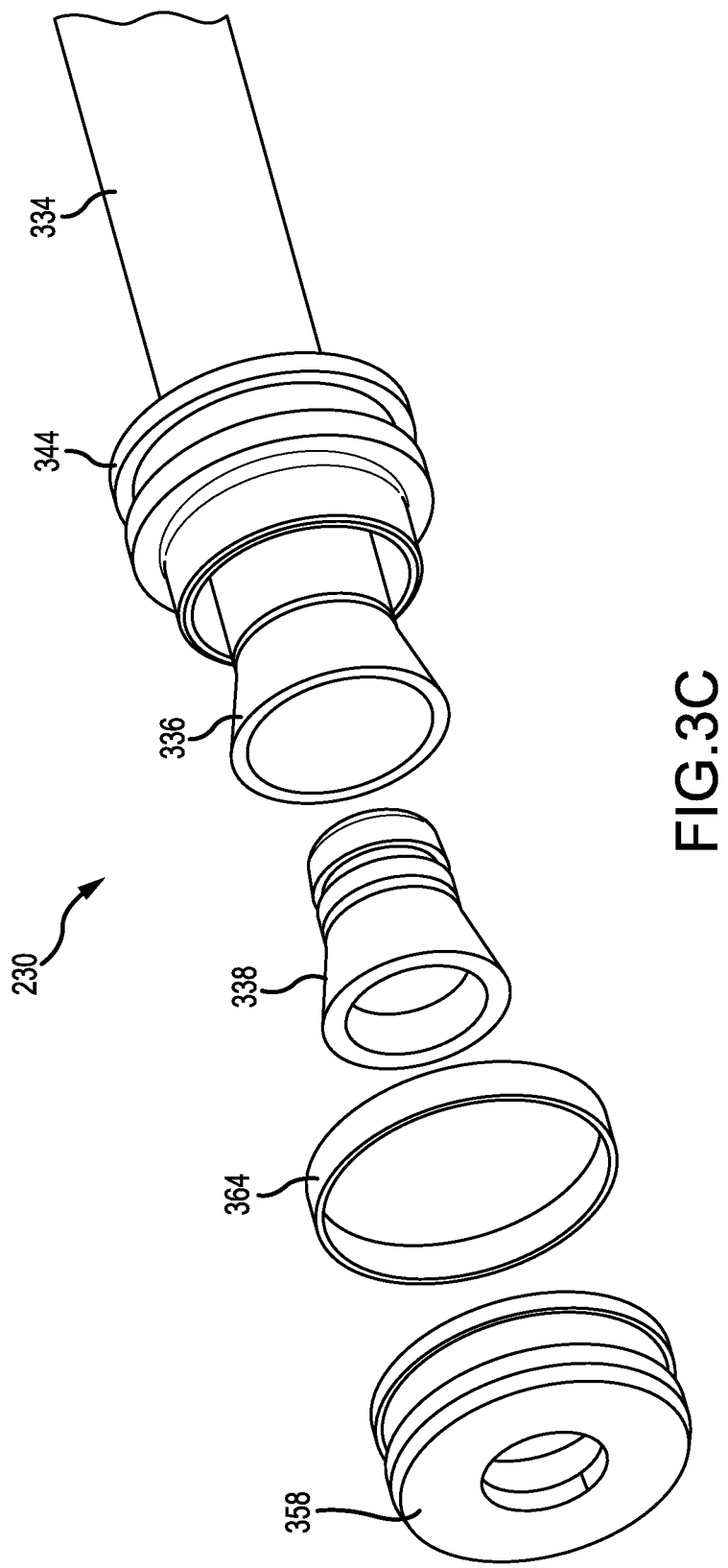
Figure 4:
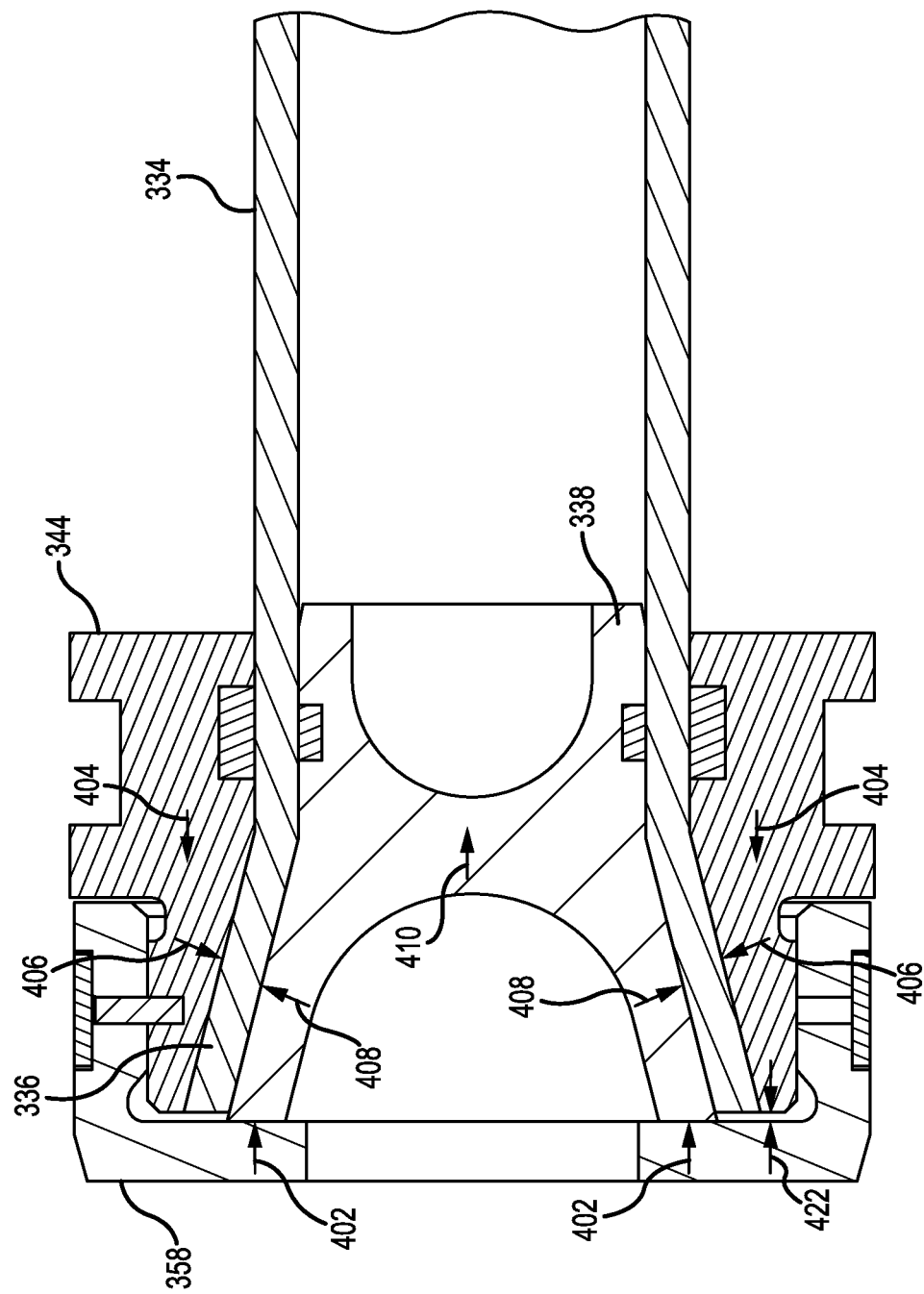
FIG. 4 illustrates the load paths through an actuator in accordance with various embodiments.

With respect to FIG. 3A through FIG. 4, elements with like element numbering as depicted in FIG. 2 are intended to be the same and will not necessarily be repeated for the sake of clarity In various embodiments, with reference to FIGS. 3A-3C, actuator 230 comprises a composite actuator rod tube 334. Composite actuator rod tube 334 may comprise, for example, a lightweight polymer matrix composite such as a carbon fiber composite material or a hydrocarbon fiber composite material. Although composite materials provide reduced weight over traditional metal components, it may be difficult to couple composite materials to metal components. Conventional methods of attaching composite materials to other materials, such as threading or drilling holes in the composite material, may significantly reduce the strength of the composite material. Other conventional methods require bonding or gluing to provide a load path between two or more components. Therefore, methods and apparatus for connecting composite material components (such as composite actuator rod tube 334) to other components (such as metallic components) may be desirable.

Composite actuator rod tube 334 may comprise a flared end 336. In various embodiments, flared end 336 is formed of a lightweight polymer matrix composite material. For example, flared end 336 may comprise the same material as composite actuator rod tube 334. Flared end 336 may be configured to provide a flared surface to engage with a metal component of actuator 230. As will be discussed in greater detail, a metal component may be secured against and held within flared end 336, eliminating the need for threading or drilling of flared end 336 and/or composite actuator rod tube 334, which would reduce the strength of and/or compromise the structural integrity of composite actuator rod tube 334.

Composite actuator rod tube 334 and flared end 336 may be formed by laying composite sheets or layers in a desired shape and bonding the layers together using resins, adhesives, or other bonding agents. In various embodiments, composite actuator rod tube 334 and flared end 336 may be formed using a fiber-wound form, wherein fiber is continuously wound onto the form and bonded together using resins, adhesives, or other bonding agents. Any manner of forming composite actuator rod tube 334 and flared end 336 is within the scope of the present disclosure.

During or after formation, flared end 336 may be pretensioned. For example, flared end 336 may be pretensioned for tensile and/or compressive loads. Such pretensioning may reduce fretting and/or extend the fatigue life of flared end 336.

In various embodiments, an insert 338 is positioned within flared end 336. Flared end 336 may comprise a conical geometry. Insert 338 may comprise a conical geometry. The geometry of insert 338 may be complementary to the geometry of flared end 336. As will be discussed in greater detail, insert 338 may be positioned within flared end 336 and held under compression by components located outside of composite actuator rod tube 334. In various embodiments, insert 338 may be placed within flared end 336 during formation of composite actuator rod tube 334 and flared end 336. In various embodiments, insert 338 may be placed within flared end 336 after formation of composite actuator rod tube 334 and flared end 336. Insert 338 may comprise, for example, a metallic material. However, insert 338 may comprise any suitable material.

Insert 338 may comprise, for example, a concical portion 340 and a cylindrical portion 342. In various embodiments, conical portion 340 may engage with flared end 336. In various embodiments, cylindrical portion 342 may engage with the inner diameter (ID) surface 335 of composite actuator rod tube 334. Insert 338 may be configured to be pushed into (in the x-direction) composite actuator rod tube 334 by components located outside of composite actuator rod tube 334.

In various embodiments, a piston head 344 may concentrically surround and be secured to flared end 336. For example, piston head 344 may be positioned concentrically around flared end 336 and secured by a piston head nut 358. Piston head 344 and/or piston head nut 358 may comprise a metallic material. However, piston head 344 and/or piston head nut 358 may comprise any suitable material.

Piston head 344 may comprise an inner surface 360 comprising a profile that is complementary to flared end 336 and/or composite actuator rod tube 334. The inner surface 360 may have one or more seal grooves 354. The piston head 344 may comprise an outer surface 352 having one or more seal grooves 354. Insert 338 may comprise an outer surface 339 having one or more seal grooves 354. A seal may be located within each of the one or more seal grooves 354. Thus, insert 338 may be sealed to actuator rod tube 334 via one or more seal grooves 354. In various embodiments, piston head 344 may be sealed to actuator rod tube 334 via one or more seal grooves 354.

In various embodiments, a locking mechanism may be used to assist in securing piston head nut 358 to piston head 344. For example, aperture 374 may be located in bearing groove 356. A slot 372 may be located in piston head 344. Piston head nut 358 may rotate to align aperture 374 with slot 372. Aperture 374 and slot 372 may extend in the radial direction. A locking pin 376 may be located in aperture 374 and in slot 372. Accordingly, locking pin 376 may be coupled between piston head nut 358 and piston head 344. Locking pin 376 may prevent piston head nut 358 from rotating with respect to piston head 344. Other locking mechanisms may also be used to secure piston head nut 358.

Piston head nut 358 may comprise an outer surface 362 having one or more bearing grooves 356. Bearing 364 may be located in bearing groove 356. Locking pin 376 may be secured by bearing 364. Stated another way, bearing 364 may prevent locking pin 376 from exiting aperture 374 and slot 372 in the radially outward direction. Bearing 364 may be located radially outward from locking pin 376.

In various embodiments, with reference to FIG. 4, piston head nut 344 is illustrated in the tightened position. In various embodiments, flared end 336 may be compressed between piston head 344 and insert 338. For example, piston head nut 358 may be threadingly attached to piston head 344, which may pull piston head 344 towards piston head nut 358, as illustrated by arrows 404, and also pull piston head nut 358 toward piston head 344, as illustrated by arrows 402, which may consequently push insert 338 into composite actuator rod tube 334 as illustrated by arrow 410. In various embodiments, tightening may compress flared end 336 between piston head 344 and insert 338, as illustrated by arrows 406 and arrows 408, respectively.

In various embodiments, piston head nut 358 and piston head 344 may be configured to be separated by a gap 422 when piston head nut 358 is in a tightened position. In various embodiments, separating piston head nut 358 and piston head 344 by gap 422 may prevent piston head nut 358 from locking against piston head 344 before flared end 336 is compressed between piston head 344 and insert 338.

Figure 5:
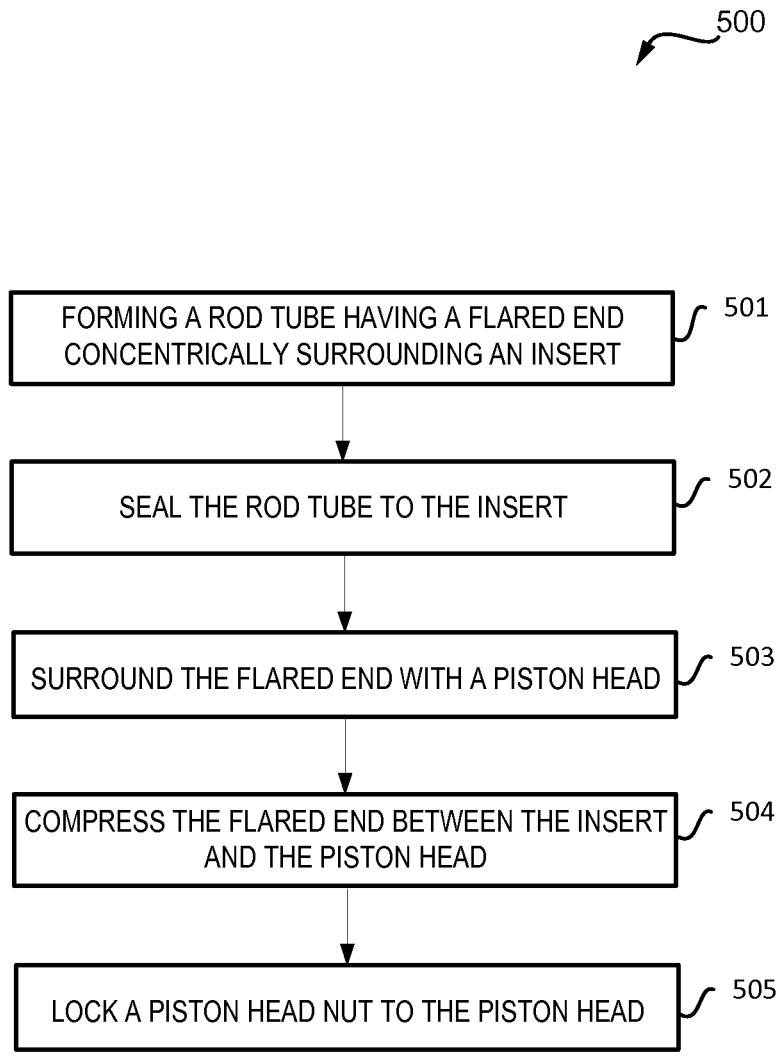
FIG. 5 provides a method for forming an actuator in accordance with various embodiments.

With reference to FIG. 5, a method for forming an actuator is provided in accordance with various embodiments. The method may include forming a rod tube having a flared end contrically surrounding an insert in step 501. Step 502 may include sealing the rod tube to the insert. Step 503 may include surrounding the flared end with a piston head. Step 504 may include compressing the flared end between the insert and the piston head. Step 505 may include locking a piston head nut to the piston head.

In various embodiments, with further reference to FIG. 3B, step 501 may include forming composite actuator rod tube 334 having a flared end 336 concentrically surrounding an insert 338 having a complementary shape to the flared end. Step 502 may include sealing composite actuator rod tube 334 to insert 338. Composite actuator rod tube 334 may be sealed to insert 338 via one or more seal grooves 354. Step 503 may include surrounding the flared end 336 with piston head 344. Piston head 344 may be secured to flared end 336 with piston head nut 358. Step 504 may include compressing flared end 336 between insert 338 and the piston head 344. Flared end 336 may be compressed between insert 338 and piston head 344 in response to tightening piston head nut 358 onto piston head 344. Step 505 may include locking piston head nut 358 to piston head 344. In various embodiments, a locking pin 376 may be inserted at least partially into aperture 374 and at least partially into slot 372 to prevent the rotation of piston head nut 358 relative to piston head 344.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuator comprising:
    a composite actuator rod tube having a flared end;
    an insert, wherein the insert has a complementary shape to the flared end;
    a piston head concentrically surrounding the flared end of the composite actuator rod tube; and
    a piston head nut concentrically surrounding the flared end of the composite actuator rod tube and configured to threadingly attach to the piston head.

2. The actuator of claim 1, wherein the insert is configured to be positioned at least partially within the flared end.

3. The actuator of claim 1, wherein the flared end is compressed between the piston head and the insert.

4. The actuator of claim 1, further comprising a locking mechanism for securing the piston head to the piston head nut, wherein the locking mechanism comprises a locking pin coupled between the piston head and the piston head nut to prevent the piston head nut from rotating with respect to the piston head.

5. The actuator of claim 4, wherein the locking pin is secured by a bearing, the bearing located radially outward from the locking pin.

6. The actuator of claim 1, wherein the piston head comprises a sealing groove.

7. The actuator of claim 1, wherein an outer surface of the insert includes a sealing groove.

8. The actuator of claim 1, wherein an outer surface of the piston head nut includes a bearing groove.

9. A landing gear system comprising:
an actuator comprising:
a composite actuator rod tube having a flared end;
an insert, wherein the insert has a complementary shape to the flared end;
a piston head concentrically surrounding the flared end of the composite actuator rod tube; and
a piston head nut concentrically surrounding the flared end of the composite actuator rod tube and configured to threadingly attach to the piston head.

10. The landing gear system of claim 9, wherein the insert is configured to be positioned at least partially within the flared end.

11. The landing gear system of claim 9, wherein the flared end is compressed between the piston head and the insert.

12. The landing gear system of claim 9, wherein an outer surface of the insert comprises a sealing groove.

13. The landing gear system of claim 9, wherein at least one of the piston head, piston head nut, or the insert comprise a metallic material.

14. The landing gear system of claim 9, wherein the actuator further comprises a locking mechanism for securing the piston head to the piston head nut.

15. A method for forming an actuator comprising:
forming a composite actuator rod tube having a flared end concentrically surrounding an insert having a complementary shape to the flared end;
surrounding the flared end with a piston head; and
surrounding the flared end with a piston head nut.

16. The method of claim 15, further comprising sealing the actuator rod tube to the insert.

17. The method of claim 15, further comprising sealing the piston head to the actuator rod tube.

18. The method of claim 17, further comprising compressing the flared end between the insert and the piston head.

19. The method of claim 18, further comprising locking the piston head nut to the piston head.

20. The actuator of claim 1, wherein the piston head nut abuts an axially facing surface of the insert.

* * * * *